US009413595B2

(12) United States Patent
Imai

(10) Patent No.: US 9,413,595 B2
(45) Date of Patent: Aug. 9, 2016

(54) MANAGEMENT SERVER, VIRTUAL MACHINE SYSTEM, COMPUTER-READABLE RECORDING MEDIUM, AND CONNECTION METHOD

(71) Applicant: FUJITSU LIMITED, Kawasaki-shi, Kanagawa (JP)

(72) Inventor: Yuji Imai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 13/966,373

(22) Filed: Aug. 14, 2013

(65) Prior Publication Data
US 2014/0122681 A1 May 1, 2014

(30) Foreign Application Priority Data

Oct. 31, 2012 (JP) ................................. 2012-240939

(51) Int. Cl.
*H04L 12/24* (2006.01)
*G06F 9/455* (2006.01)
*H04L 29/12* (2006.01)

(52) U.S. Cl.
CPC ............ *H04L 41/04* (2013.01); *G06F 9/45558* (2013.01); *H04L 61/251* (2013.01); *H04L 61/2525* (2013.01); *G06F 2009/45587* (2013.01); *G06F 2009/45595* (2013.01); *H04L 61/2015* (2013.01)

(58) Field of Classification Search
CPC ................................. H04L 41/00; H04L 12/24
USPC ........................................................ 709/223
See application file for complete search history.

(56) References Cited

U.S. PATENT DOCUMENTS

| 6,061,349 | A | * | 5/2000 | Coile et al. | 370/389 |
|---|---|---|---|---|---|
| 8,301,738 | B1 | * | 10/2012 | Alex | 709/222 |
| 8,683,023 | B1 | * | 3/2014 | Brandwine et al. | 709/222 |
| 8,959,338 | B2 | * | 2/2015 | Snow et al. | 713/162 |
| 2002/0087721 | A1 | | 7/2002 | Sato et al. | |
| 2003/0048804 | A1 | | 3/2003 | Inouchi et al. | |
| 2006/0109797 | A1 | * | 5/2006 | Ishida et al. | 370/252 |
| 2007/0280243 | A1 | * | 12/2007 | Wray et al. | 370/392 |

(Continued)

FOREIGN PATENT DOCUMENTS

JP   2002-354006 A   12/2002
JP   2003-87336 A    3/2003

(Continued)

OTHER PUBLICATIONS

Droms, RFC 2131, Mar. 1997, 45 pages.*
Japanese Office Action mailed Apr. 12, 2016 for corresponding Japanese Patent Application No. 2012-240939, with Partial English Translation, 4 pages.

*Primary Examiner* — Wing F Chan
*Assistant Examiner* — Leon Y Tseng

(57) ABSTRACT

A management server 10 includes a vSW usage management table 11 for storing an index for identifying an interface for each customer intranet 4, where the interface is used to connect a VM 23 and a PC5 in the customer intranet 4 connected via a router 3 and is being used. When the management server 10 is compatible with an IPv4 network and when receiving a connection request for a connection to the router 3 connected to the customer intranet 4, the management server specifies an identifier for identifying an interface that is not stored in the vSW usage management table 11, connects the router 3 and the VM 23 by using the interface indicated by the specified identifier.

10 Claims, 11 Drawing Sheets

(56) References Cited

U.S. PATENT DOCUMENTS

| | | |
|---|---|---|
| 2009/0248846 A1 | 10/2009 | Cohn |
| 2009/0248896 A1 | 10/2009 | Cohn |
| 2011/0191492 A1 | 8/2011 | Imai |
| 2011/0292942 A1 | 12/2011 | Imai |
| 2012/0317567 A1* | 12/2012 | Bailey et al. .............. 718/1 |
| 2014/0013324 A1* | 1/2014 | Zhang et al. .............. 718/1 |

FOREIGN PATENT DOCUMENTS

| | | |
|---|---|---|
| JP | 2003-283577 | 10/2003 |
| JP | 2011-517815 A | 6/2011 |
| JP | 2011-160300 | 8/2011 |
| JP | 2011-248690 | 12/2011 |
| JP | 2011-250209 | 12/2011 |

* cited by examiner

FIG.11

| USER NAME | VIRTUAL SWITCH (ID) | v4v6 TRANSLATION MODULE (ID) | INTERFACE CONNECTION STATUS | | |
|---|---|---|---|---|---|
| | | | VIRTUAL MACHINE (ID) | v4 eth INTERFACE (INDEX) | v6 eth INTERFACE (INDEX) |
| A CORPORATION | vsw-001 | v4v6-0 | NAS-001 | 0 | 1 |
| B STORE | vsw-002 | v4v6-1 | NAS-001 | 2 | 3 |
| C CONVENIENCE STORE | vsw-003 | v4v6-3 | CASH REGISTER SaaS-002 | 0 | 1 |

MANAGEMENT SERVER, VIRTUAL MACHINE SYSTEM, COMPUTER-READABLE RECORDING MEDIUM, AND CONNECTION METHOD

CROSS-REFERENCE TO RELATED APPLICATION

This application is based upon and claims the benefit of priority of the prior Japanese Patent Application No. 2012-240939, filed on Oct. 31, 2012, the entire contents of which are incorporated herein by reference.

FIELD

The embodiments discussed herein are directed to a management server, a virtual machine system, a program, and a connection method.

BACKGROUND

There is a known technology for using a virtual machine on a cloud data center via a customer's intranet (for example, Japanese Laid-open Patent Publication No. 2011-250209).

FIG. 12 is a diagram for explaining an example of the conventional technology. As illustrated in FIG. 12, when a router 200 connected to a customer's intranet is connected to a carrier communication network, the router 200 transmits pre-registered virtual-machine (VM) device information to a data center 100 connected to the carrier communication network. The router 200 establishes a connection to a gateway (GW) cell 110 in the data center 100 based on information acquired from the data center 100. In addition, the router 200 acquires, from the data center 100, an Internet protocol (IP) address of a virtual router 130 connected to a virtual machine 120 activated in the data center 100, based on the VM device information. The router 200 communicates with the virtual router 130 via the connection to the GW cell 110 based on the IP address of the virtual router 130. Therefore, the router 200 allows a customer to communicate with the virtual machine 120 operating in the data center 100 as if the virtual machine 120 serves as a server directly connected to a local area network (LAN).

Meanwhile, the Internet protocol includes IPv4 and IPv6. In IPv6, there is a technology for identifying each of networks (link-locals) connected to a plurality of link-local addresses assigned to a single server, based on an identifier. The identifier is referred to as, for example, a zone index. Specifically, a plurality of network interfaces are virtually generated in a server, and a link-local address is assigned to each of the generated network interfaces. The server uses the zone index to identify each of customer's link-locals using the link-local addresses.

A process on the virtual machine activated in the data center recognizes a zone index. FIG. 13 is a diagram for explaining an IPv6 zone index. As illustrated in FIG. 13, a plurality of customer's intranets are connected to a virtual machine. The same IPv6 link-local address of "fe80::1234" is assigned to a PC in a customer's intranet A and a PC in a customer's intranet B. Even in this case, the process on the virtual machine can identify each of the customer's link-locals by using a zone index added to each of the IPv6 link-local addresses. In this example, the process on the virtual machine can recognize the customer's link-local of the intranet A by using a zone index of "0" added to "fe80::1234". Furthermore, the process on the virtual machine can recognize the customer's link-local of the intranet B by using a zone index of "1" added to "fe80::1234".

Incidentally, the process on the virtual machine does not recognize a zone index in IPv4. Therefore, in IPv4, there is a problem in that it is difficult to enable secure communication between a single virtual machine and a plurality of customer's networks. Specifically, if IPv4 link-local addresses on the customer side are the same, it is difficult to identify each of the customer's link-locals for the process on the virtual machine. Therefore, it is impossible to enable secure communication between a single virtual machine and a plurality of customer networks.

SUMMARY

According to an aspect of an embodiment, a management server includes a storage unit and a connecting unit. The storage unit stores therein an identifier for identifying an interface for each network, the interface being configured to connect the virtual machine and an information processing apparatus that belongs to a network connected to the management server via a relay device connected to the management server via a virtual private network and being currently used. The connecting unit, when the physical server is compatible with an IPv4 network and when receiving a connection request to establish a connection to the relay device connected to the network of the information processing apparatus, specifies an identifier for identifying an interface that is not stored in the storage unit with respect to a virtual machine corresponding to the connection request, and connects the relay device and the virtual machine based on an address of a virtual switch corresponding to the interface indicated by the specified identifier and based on an address of the relay device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11 is a diagram illustrating an example of a data structure of a vSW usage management table according to the second embodiment;

DESCRIPTION OF EMBODIMENTS

Preferred embodiments of the present invention will be explained with reference to accompanying drawings. The present invention is not limited to the embodiments below.

[a] First Embodiment

Configuration of a Virtual Machine System

Figure 1:
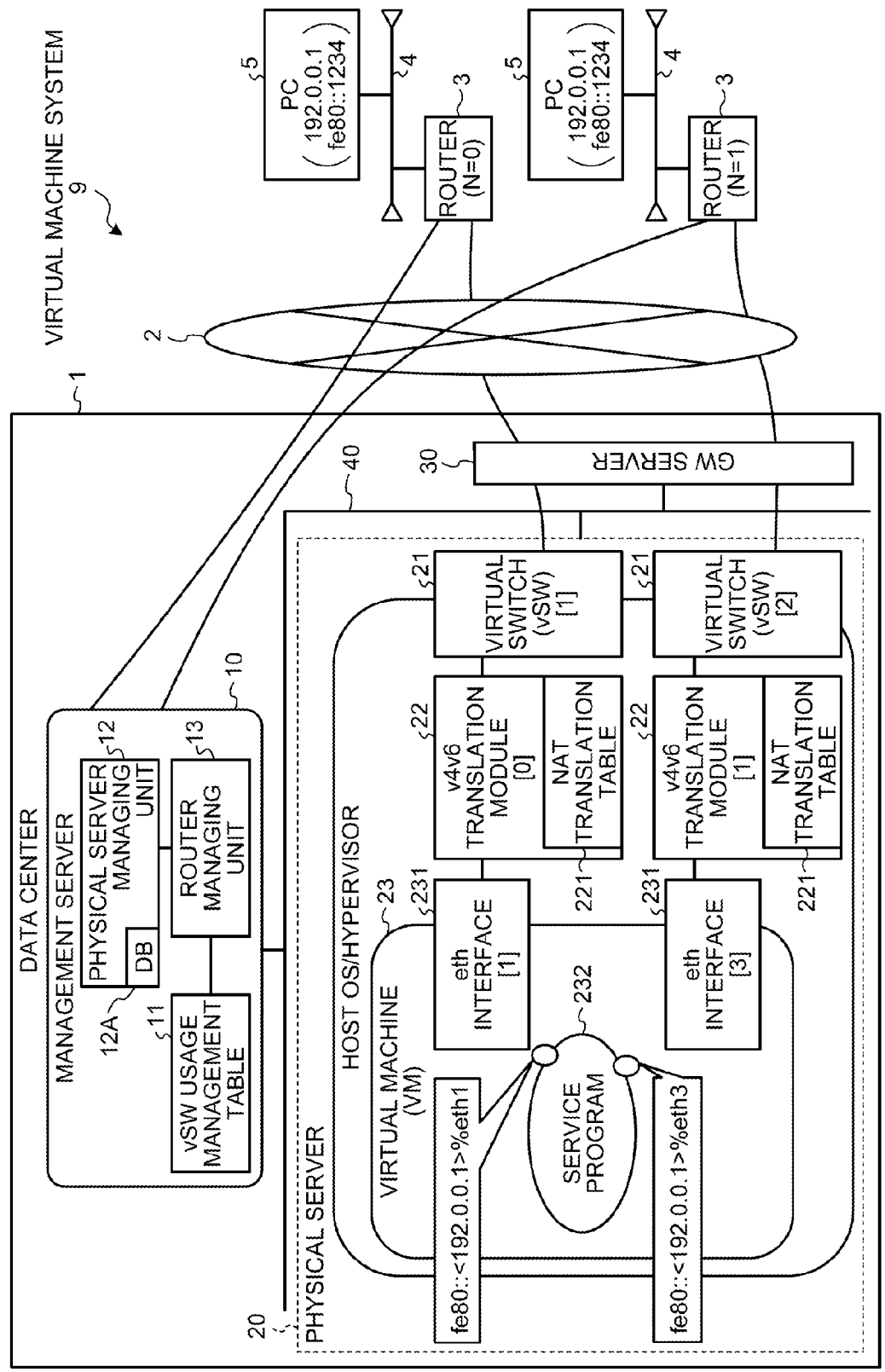
FIG. 1 is a diagram of a configuration of a virtual machine system according to a first embodiment.

FIG. 1 is a diagram of a configuration of a virtual machine system according to a first embodiment. As illustrated in FIG. 1, a virtual machine system 9 includes a data center 1, a PPPoE (Point to Point Protocol over Ethernet (registered trademark)) network 2 provided by a communication carrier, a router 3, a customer intranet 4, and a customer personal computer (PC) 5.

The data center 1 is a data center for cloud computing for providing services, such as a software package or an application execution platform, to the customer PC 5 via the PPPoE network 2.

The PPPoE network 2 is one example of a carrier communication network provided by a communication carrier. The PPPoE is a protocol that uses functions of a PPP (Point to Point Protocol) via the Ethernet (registered trademark) and serves as a protocol for a virtual private communication network to be described later. The PPPoE network 2 is a wide area network (WAN).

The router 3 is a router for cloud computers and is used to connect the customer intranet 4 to the data center 1. The router 3 transmits a processing capability of a VM device requested to be provided, that is, information for defining settings of the VM device (hereinafter, referred to as "VM device information"), to a management server 10. As the setting information, for example, an operating system (OS), a hardware resource such as a hard disk capacity or a memory capacity, or an application of the VM device is recorded.

The customer intranet 4 is a customer's intranet using IPv4. The customer PC 5 is connected to the customer intranet 4. The customer PC 5 may directly be connected to the router 3. The customer PC 5 is one example of an external apparatus.

An IPv4 address as a link-local address is set in the customer PC 5. The link-local address is an address defined in the customer intranet 4. Herein, the link-local indicates the customer intranet 4. In the virtual machine system 9 according to the embodiments, even if the link-local addresses of the customer PCs 5 defined in a plurality of the customer intranets 4 are the same, each of the customer PCs 5 can securely be connected to a same virtual machine 23. In the following, an "IPv4 link-local address" is described as an "IPv4 address" or a "v4 address". Similarly, an "Ipv6 link-local address" is described as an "IPv6 address" or "a v6 address".

Explanation of a Configuration of the Data Center

The data center 1 includes the management server 10, a physical server 20, and a gateway (GW) server 30. The management server 10 is connected to the physical server 20 via a local area network (LAN) 40. In the first embodiment, a case will be explained in which the management server 10 is compatible with an IPv4-based network.

Explanation of a Configuration of the Physical Server

The physical server 20 includes a host OS/hypervisor in which a host OS and a hypervisor are integrated. The physical server 20 also includes, in the host OS/hypervisor, a virtual switch (vSW) 21, a v4v6 translation module 22, and the virtual machine 23. While it is explained that the host OS and the hypervisor are integrated in the host OS/hypervisor, it is not limited thereto. It may be possible to separate the host OS and the hypervisor. In this case, the physical server 20 includes the host OS on the hypervisor and includes the virtual switch 21, the v4v6 translation module 22, and the virtual machine 23 on the host OS. The number of the virtual machines 23 is not limited to one and may be two or more. The number of the physical server 20 is not limited to one and may be two or more.

The virtual switch 21 is a firewall router included in what is called a virtual router, and receives access from only a specific customer PC. It may be possible to provide the same number of the virtual switches 21 as eth interfaces 231 to be described later, and the virtual switches 21 are distinguished from one another by identification IDs (identifiers).

The v4v6 translation module 22 performs network address translation (NAT) in order to translate a v4 address used for communication with the customer intranet 4 into a virtual v4 address used by the virtual machine 23. The v4v6 translation module 22 also performs NAT in order to translate the virtual v4 address used by the virtual machine 23 into the v4 address used for communication with the customer intranet 4. The virtual v4 address corresponds to a v6 address. Similarly to the virtual switches 21, it may be possible to provide the same number of the v4v6 translation modules 22 as the eth interfaces 231 to be described later, and the v4v6 translation modules 22 are distinguished from one another by identification IDs.

A rule of address translation performed by the v4v6 translation module 22 will be explained below. For example, if a v4 address is "www.xxx.yyy.zzz", a v6 address serving as a virtual v4 address is "fe80::<WWW.XXX.YYY.ZZZ>". The v4 address of "www.xxx.yyy.zzz" is represented by decimal notation. Meanwhile, <WWW.XXX.YYY.ZZZ> in the v6 address is a string obtained by translating the decimal notation of the v4 address into hexadecimal notation. The v4 address is set on the virtual switch 21 side of the v4v6 translation module 22, and the v6 address is set on the eth interface 231 side (to be described later) of the v4v6 translation module 22.

As one example, if the management server 10 assigns a v4 address to the virtual machine 23, the v4v6 translation module 22 translates the assigned IP address into a v6 address serving as a virtual v4 address. The IP address assigned to the virtual machine 23 means an address to be a transmission destination of the customer PC 5, and is the v4 address. The v4v6 translation module 22 sets the v6 address after translation on the eth interface 231 side to be described later, and sets the v4 address before translation on the virtual switch 21 side. The v4v6 translation module 22 is instructed to set an address by a router managing unit 13 to be described later.

As another example, when a dynamic host configuration protocol (DHCP) server of the customer intranet 4 side assigns an IP address of the virtual machine 23, the v4v6 translation module 22 translates the assigned IP address into a v6 address serving as a virtual v4 address. The v4v6 translation module 22 sets the v6 address after translation on the eth interface 231 side to be described later, and sets the v4 address before translation on the virtual switch 21 side. The v4v6 translation module 22 is instructed to set an address by the router managing unit 13 to be described later.

The v4v6 translation module 22 registers the v4 address before translation and the v6 address after translation in an NAT translation table 221 in an associated manner. For example, assuming that a v4 address is "192.0.0.192" and a v6 address is "fe80::<192.0.0.192>", "192.0.0.192" and "fe80::<192.0.0.192>" are registered in the NAT translation table 221 in an associated manner.

The virtual machine 23 activates a virtual OS or an application provided to a customer. The virtual machine 23 includes a plurality of Ethernet interfaces (hereinafter, referred to as "eth interfaces") 231 and a service program 232.

The eth interfaces 231 are communication interfaces virtually generated on the virtual machine 23. The number of the eth interfaces 231 to be generated can be increased to the upper limit number of interfaces of a virtual OS (also referred to as a guest OS) (not illustrated) on the virtual machine 23. A fixed identifier (index) is assigned to each of the eth interfaces 231. Specifically, the index assigned to each of the eth interfaces 231 corresponds to a zone index defined by IPv6. As one example, in FIG. 1, "1" is assigned to one of the eth interfaces 231 and "3" is assigned to the other one of the eth interfaces 231. The eth interfaces 231 are channels for the customer intranets 4 that generate link-locals with the virtual machine 23.

The service program 232 is a socket application program interface (API) for associating sockets and the eth interfaces 231 by using socket communication. For example, for communication with a customer side, the service program 232 assigns an IP address of the customer side and the index of the eth interface 231 used for the communication to a socket. The IP address in this example is a v6 address obtained by translating the v4 address of the customer side into a virtual v4 address by the v4v6 translation module 22. When a specific socket is designated, the service program 232 acquires the IP address of a customer side using the designated socket and the index of the eth interface 231. Therefore, the service program 232 can identify the customer intranet 4 to which the IP address assigned to the socket belongs, by using the index of the eth interface 231.

As one example, it is assumed that the IP address of the customer side using a socket is "fe80::<192.0.0.1>" and the index of the eth interface 231 is "1". In this case, when the socket is designated, the service program 232 acquires the IP address of "fe80::<192.0.0.1>" of the customer side using the socket and the index of "1" of the eth interface 231. Meanwhile, it is assumed that the IP address of a customer side using another socket is "fe80::<192.0.0.1>" and the index of the eth interface 231 is "3". In this case, when the socket is designated, the service program 232 acquires the IP address of "fe80::<192.0.0.1>" of the customer side using the socket and the index of "3" of the eth interface 231. Namely, even when the IP addresses of the customer sides are the same, the service program 232 can distinguish between the link-local addresses of the customers by using the indices of the eth interfaces 231. As the service program 232, an API defined as basic socket interface extensions for IPv6 by RFC 3493 is applicable.

The GW server 30 includes a gateway program and executes the gateway program to send data between the virtual switch 21 and the PPPoE network 2.

Explanation of a Configuration of the Management Server

The management server 10 includes a vSW usage management table 11, a physical server managing unit 12, and the router managing unit 13. The vSW usage management table 11 is a table for managing usage of the virtual switch 21. A data structure of the vSW usage management table 11 will be explained below with reference to FIG. 2.

Figure 2:
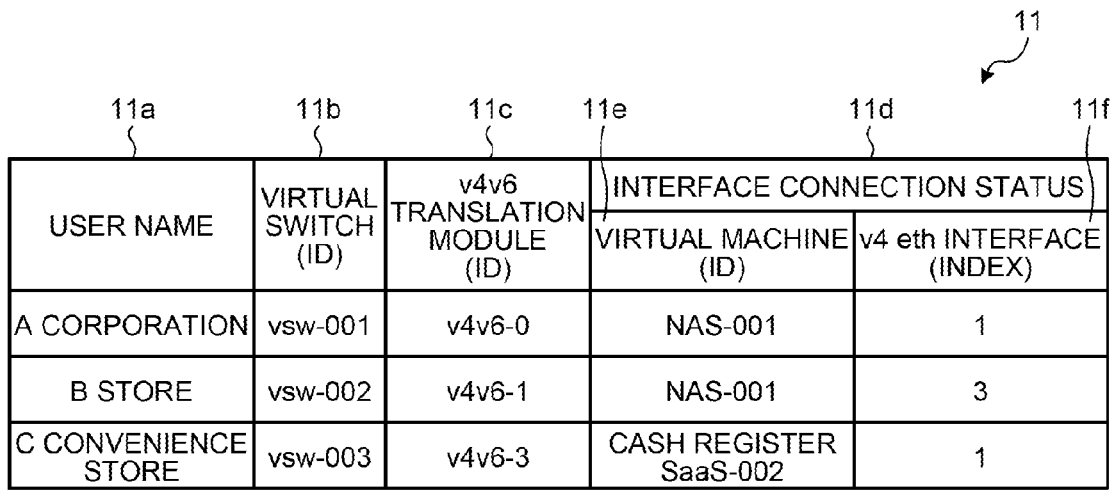
FIG. 2 is a diagram illustrating an example of a data structure of a vSW usage management table according to the first embodiment.

FIG. 2 is a diagram illustrating an example of the data structure of the vSW usage management table according to the first embodiment. As illustrated in FIG. 2, the vSW usage management table 11 stores a virtual switch (ID) 11b, a v4v6 translation module (ID) 11c, and an interface connection status 11d in association with a user name 11a. The user name 11a indicates a name of a customer of the customer intranet 4 connected to the virtual machine 23. The virtual switch 11b indicates an identification ID of the virtual switch 21. The v4v6 translation module (ID) 11c indicates an identification ID of the v4v6 translation module 22. The interface connection status 11d represents a connection status of the eth interface 231, and contains a virtual machine (ID) 11e and a v4 eth interface (index) 11f. The virtual machine (ID) 11e indicates an identification ID of the virtual machine 23 connected to the customer intranet 4. The v4 eth interface (index) 11f indicates an index of the eth interface 231 used in IPv4.

As one example, when the user name 11a is "A Corporation", "vsw-001" is stored as the virtual switch (ID) 11b and "v4v6-0" is stored as the v4v6 translation module (ID) 11c. Furthermore, "NAS-001" is stored as the virtual machine (ID) 11e and "1" is stored as the v4 eth interface (index) 11f.

Referring back to FIG. 1, the physical server managing unit 12 includes a database (DB) 12A.

Figure 3:
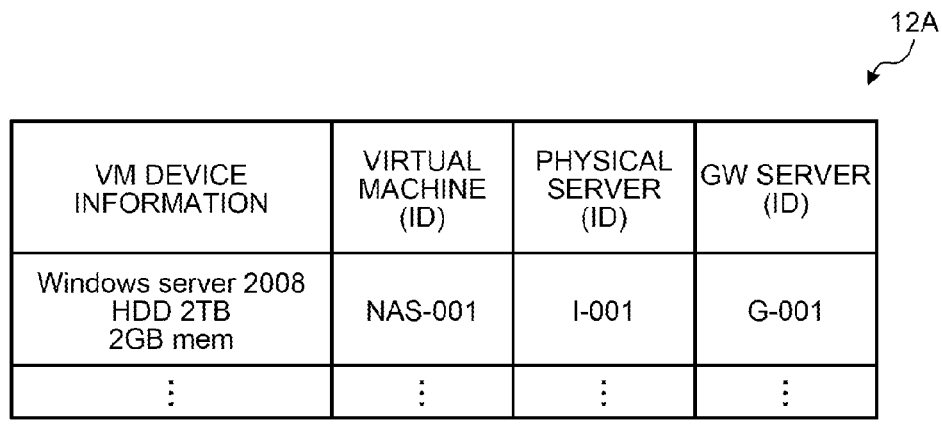
FIG. 3 is a diagram illustrating an example of a data structure of a database.

FIG. 3 is a diagram illustrating an example of a data structure of the database 12A. As illustrated in FIG. 3, in the database 12A, identification IDs of the virtual machine 23, the physical server 20, and the GW server 30 are registered in association with the VM device information received from the router 3. The VM device information is information for identifying the physical server 20 that activates the virtual machine 23, and in particular, information on an OS and hardware resources of the physical server 20.

As one example, when the VM device information contains "Windows (registered trademark) server 2008" as the OS and "HDD 2TB, 2GB mem" as the hardware resources, "NAS-001" is stored as the virtual machine 23, "I-001" is stored as the physical server 20, and "G-001" is stored as the GW server 30.

Referring back to FIG. 1, the physical server managing unit 12 manages operations of each of the physical servers 20. For example, when receiving the VM device information from the router 3, the physical server managing unit 12 selects the virtual machine 23, the physical server 20, and the GW server 30 registered in the database 12A based on the VM device information. Subsequently, the physical server managing unit 12 activates the selected physical server 20 and the selected GW server 30, and causes the selected physical server 20 to activate the virtual machine 23 and the service program 232.

The router managing unit 13 establishes communication between the router 3 that has issued a connection request and the GW server 30, and performs a connection process between the virtual switch 21 and the eth interface 231 in order to connect the router 3 and the virtual machine 23 that satisfies the connection request. The router managing unit 13 gives an instruction to set a virtual v4 address on the eth interface 231 side with respect to the V4 address assigned to the virtual machine 23. A configuration of the router managing unit 13 will be explained below with reference to FIG. 4.

Figure 4:
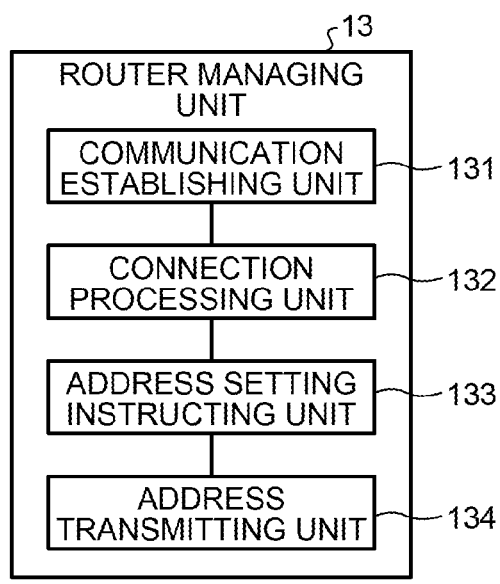
FIG. 4 is a block diagram illustrating a configuration of a router managing unit.

FIG. 4 is a block diagram illustrating the configuration of the router managing unit. As illustrated in FIG. 4, the router managing unit 13 includes a communication establishing unit 131, a connection processing unit 132, an address setting instructing unit 133, and an address transmitting unit 134.

The communication establishing unit 131 establish PPPoE session communication between the router 3 and the GW server 30 on an IP-VPN (IP-Virtual Private Network) established by a communication carrier. The IP-VPN is a virtual private network (VPN) established via a wide-area IP network of the communication carrier. In FIG. 1, the IP-VPN is a VPN for connecting the data center 1 and the router 3 via the PPPoE network 2. Examples of the IP-VPN include a FLET'S VPN WIDE provided by a communication carrier.

For example, when the router 3 is connected between the PPPoE network 2 and the customer intranet 4, the communication establishing unit 131 receives, from the router 3, VM device information as a connection request between the router 3 and the virtual machine 23. Subsequently, the communication establishing unit 131 requests the communication carrier to generate an operation-phase IP-VPN and two sets of operation-phase PPPoE setting information. The communication establishing unit 131 acquires, from the physical server managing unit 12, pieces of information on an activation-target physical server 20, an activation-target virtual machine 23, and an activation-target GW server 30 that are to be activated in the data center 1, based on the VM device information. The pieces of information acquired in this example are IDs. Furthermore, upon receiving the two sets of operation-phase PPPoE setting information from the communication carrier, the communication establishing unit 131 transmits one set of operation-phase PPPoE setting information to the router 3 and transmits the other set of operation-phase PPPoE setting information to the GW server 30 corresponding to the information on the activation-target GW server 30.

The connection processing unit 132 connects the vSW 21, the v4v6 translation module 22, and the eth interface 231 of the virtual machine 23 for each connection request from the router 3. For example, the connection processing unit 132 specifies an index of the unused eth interface 231 for v4 that is not stored in the vSW usage management table 11 with respect to the virtual machine 23 corresponding to the VM device information that is received as the connection request from the router 3. Subsequently, the connection processing unit 132 requests the service program 232 of the corresponding virtual machine 23 to generate a new eth interface 231 indicated by the specified index, a new v4v6 translation module 22, and a new virtual switch 21. The connection processing unit 132 connects the eth interface 231, the v4v6 translation module 22, and the virtual switch 21 that are generated by the request. The connection processing unit 132 adds pieces of information on the eth interface 231, the virtual switch 21, and the v4v6 translation module 22 used for the connection to the vSW usage management table 11 in association with a user name corresponding to the customer who has issued the connection request. The user name corresponding to the customer who has issued the connection request is contained in, for example, the connection request.

The address setting instructing unit 133 gives an instruction to set a virtual v4 address on the eth interface 231 side with respect to the v4 address assigned to the virtual machine 23. For example, when the management server 10 assigns the v4 address of the virtual machine 23, the address setting instructing unit 133 performs a process as described below. Specifically, the address setting instructing unit 133 searches the vSW usage management table 11 for an identification ID of the v4v6 translation module 22 and an index of the eth interface 231 corresponding to the customer who has issued the connection request. Subsequently, the address setting instructing unit 133 gives an instruction to set a v6 address, which is translated from the v4 address assigned by the management server 10, on the eth interface 231 side indicated by the index obtained by the search. The address setting instructing unit 133 gives the instruction to the v4v6 translation module 22 indicated by the identification ID obtained by the search.

Furthermore, when a DHCP server of the customer intranet 4 that has issued the connection request assigns the v4 address of the virtual machine 23, the address setting instructing unit 133 performs a process as described below. Specifically, the address setting instructing unit 133 searches the vSW usage management table 11 for an identification ID of the v4v6 translation module 22 and an index of the eth interface 231 corresponding to the customer who has issued the connection request. Subsequently, the address setting instructing unit 133 gives an instruction to set a v6 address, which is translated from the v4 address assigned by the DHCP server, on the eth interface 231 side indicated by the index obtained by the search. The address setting instructing unit 133 gives the instruction to the v4v6 translation module 22 indicated by the identification ID obtained by the search.

The address transmitting unit 134 notifies the router 3 of a v4 address assigned to the virtual switch 21, notifies the virtual switch 21 of an IP address of the router 3, and establishes communication between the router 3 and the virtual switch 21 based on Ethernet over IP.

Hardware Configuration of the Management Server

Figure 5:
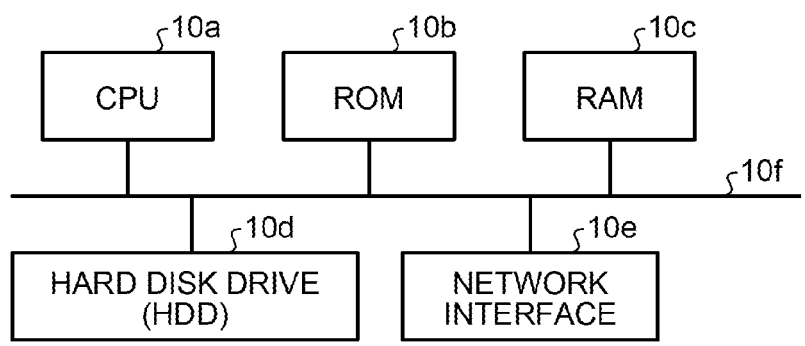
FIG. 5 is a block diagram illustrating a hardware configuration of a management server.

FIG. 5 is a block diagram illustrating a hardware configuration of the management server 10.

As illustrated in FIG. 5, the management server 10 includes a CPU 10a that controls the entire apparatus, a ROM 10b for storing a control program, and a RAM 10c that functions as a working area. The management server 10 also includes a hard disk drive (HDD) 10d for storing various types of information and programs and a network interface 10e for establishing a connection with the PPPoE network 2.

The CPU 10a is connected to the ROM 10b, the RAM 10c, and the network interface 10e via a system bus 10f. The hardware configuration of the management server 10 and the hardware configuration of the physical server 20 are the same, and therefore, explanation of the hardware configuration of the physical server 20 will be omitted. Each of processing units of the physical server managing unit 12 and the router managing unit 13 is implemented by causing the CPU 10a of the management server 10 to execute a control program stored in the ROM 10b or the HDD 10d of the management server 10. The vSW usage management table 11 and the database 12A illustrated in FIG. 1 are stored in the HDD 10d of the management server 10.

Sequence of a Process Performed by the Virtual Machine System

Figure 6:
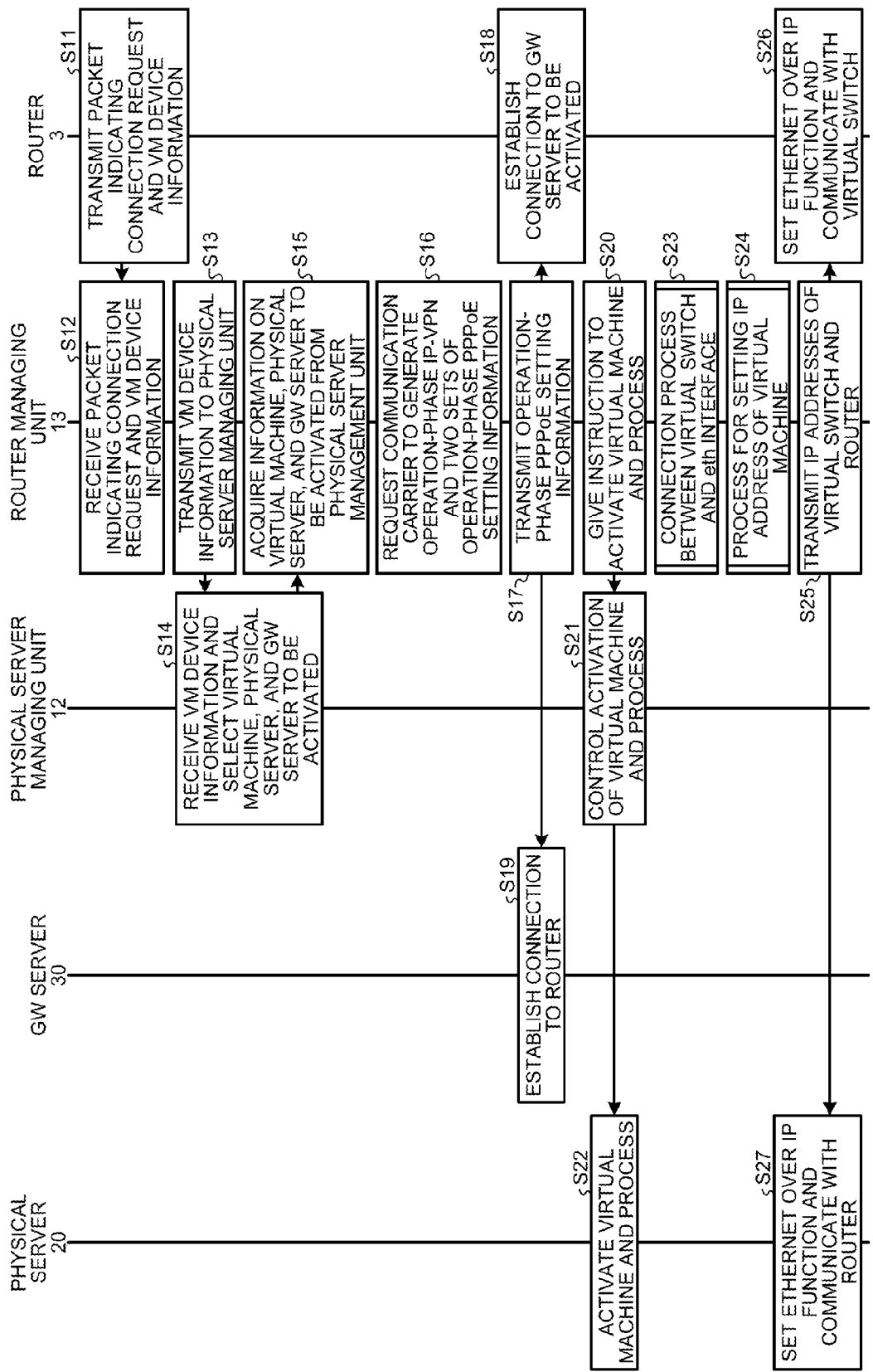
FIG. 6 is a diagram for explaining the sequence of a process performed by the virtual machine system.

FIG. 6 is a diagram for explaining the sequence of a process performed by the virtual machine system. It is assumed that a VM device configuration for identifying the physical server 20 that activates the virtual machine 23 is set in the router 3. It is also assumed that the router 3 establishes a connection to the GW server 30 by using a setting-phase PPPoE when the router 3 is connected.

When the router 3 transmits a packet indicating a connection request and VM device information to the router managing unit 13 (Step S11), the router managing unit 13 receives the packet indicating the connection request and the VM device information from the router 3 (Step S12). The router managing unit 13 transmits the VM device information to the physical server managing unit 12 (Step S13). The physical server managing unit 12 receives the VM device information, and selects an activation-target virtual machine 23, an activation-target physical server 20, and an activation-target GW server 30 that are to be activated (Step S14).

The router managing unit 13 acquires, from the physical server managing unit 12, pieces of information on the activation-target virtual machine 23, the activation-target physical server 20, and the activation-target GW server 30 (Step S15). The router managing unit 13 requests a communication carrier to generate an operation-phase IP-VPN and two sets of operation-phase PPPoE setting information (Step S16). The communication carrier establishes the operation-phase IP-VPN in response to the request from the router managing unit 13 and sends, as a reply, the two sets of operation-phase PPPoE setting information to the router managing unit 13. The router managing unit 13 transmits one set of operation-phase PPPoE setting information to the router 3 and transmits the other set of operation-phase PPPoE setting information to the activation-target GW server 30 (Step S17).

The router 3 establishes a connection to the activation-target GW server 30 by using the operation-phase PPPoE setting information (Step S18). The activation-target GW server 30 establishes a connection to the router 3 by using the operation-phase PPPoE setting information (Step S19). Therefore, the router 3 and the activation-target GW server 30 can communicate with each other via a virtual private channel using the Ethernet.

Subsequently, the router managing unit 13 instructs the physical server managing unit 12 to activate the virtual machine 23 corresponding to the information on the activation-target virtual machine 23 acquired at Step S15 and to activate a process on the virtual machine 23 (Step S20). The physical server managing unit 12 causes the activation-target physical server 20 to activate the activation-target virtual machine 23 and to activate the process on the virtual machine 23 (Step S21). The physical server 20 activates the virtual machine 23 and the process on the virtual machine 23 (Step S22). The process on the virtual machine 23 includes the service program 232 on the virtual machine 23.

The router managing unit 13 performs a connection process between the virtual switch 21 and the eth interface 231 (Step S23). This process will be explained later with reference to FIG. 7.

The router managing unit 13 performs a process for setting a v4 IP address assigned to the virtual machine 23 (Step S24). Consequently, the virtual switch 21 is generated and the v4 IP address of the virtual machine 23 is assigned to the virtual switch 21 side. This process will be explained later with reference to FIG. 8 and FIG. 9.

The router managing unit 13 transmits the IP address of the generated virtual switch 21 to the router 3 and transmits the IP address of the router 3 to the generated virtual switch 21 (Step S25). The router 3 receives the IP address of the generated virtual switch 21 from the router managing unit 13. The router 3 sets an Ethernet over IP function and communicates with the generated virtual switch 21 via the connection established between the GW server 30 and the router 3 based on the received IP address (Step S26). The generated virtual switch 21 in the physical server 20 receives the IP address of the router 3 from the router managing unit 13. The virtual switch 21 sets the Ethernet over IP function, that is, a function to generate an IP packet of data to be transmitted and received. At the same time, the virtual switch 21 communicates with the router 3 via the connection established between the GW server 30 and the router 3 based on the received IP address (Step S27).

Therefore, the customer intranet 4 corresponding to the router 3 that has issued the connection request can communicate with the virtual machine 23 via the virtual switch 21 that differs for each customer. Consequently, even when the v4 addresses of the customer PCs 5 defined in a plurality of the customer intranets 4 are the same, each of the customer PCs 5 can securely communicate with the same virtual machine 23.

Figure 7:
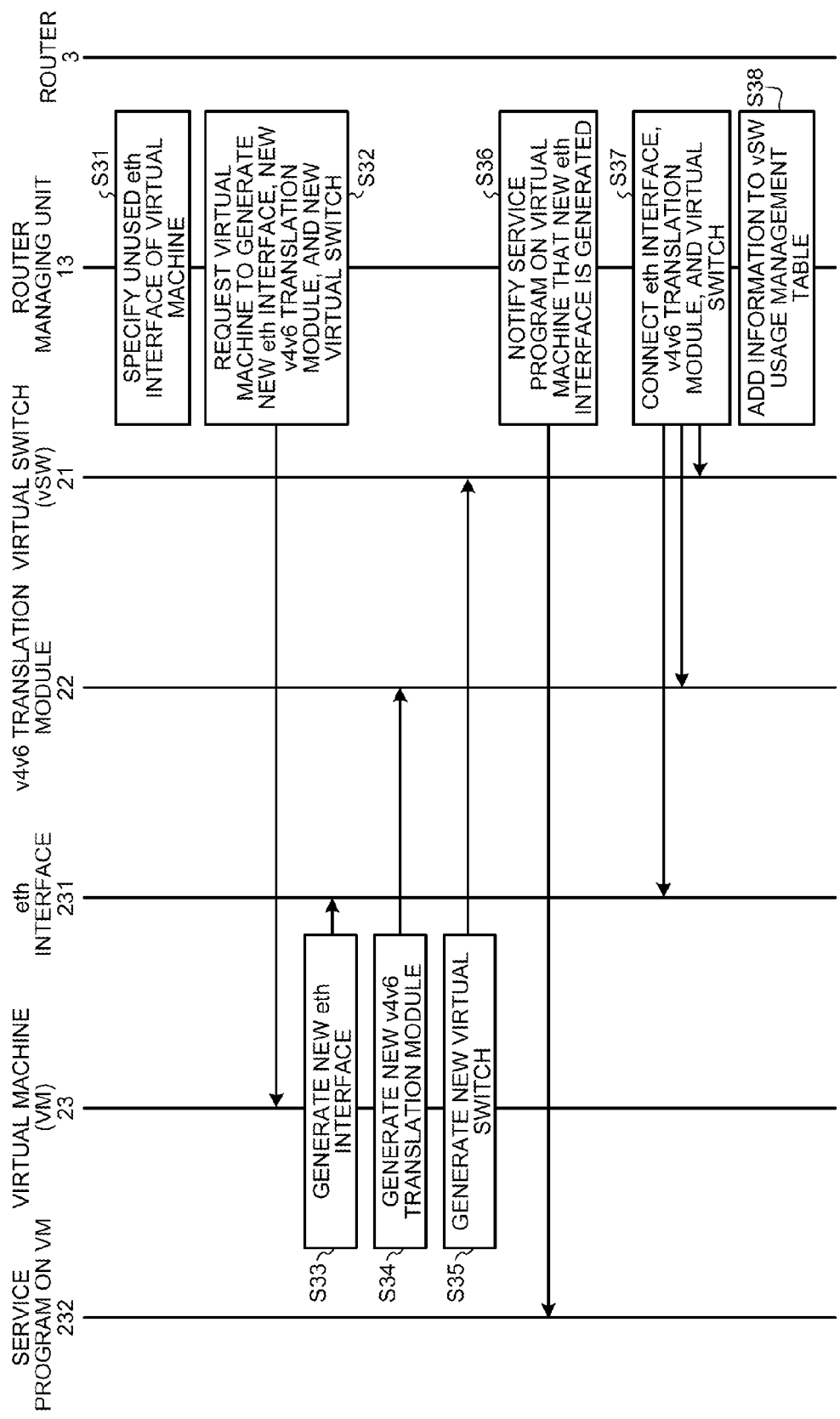
FIG. 7 is a diagram for explaining the sequence of a connection process between a virtual switch and an eth interface according to the first embodiment.

Sequence of the Connection Process Between the Virtual Switch and the eth Interface The process at S23 in FIG. 6 will be explained below with reference to FIG. 7. FIG. 7 is a diagram for explaining the sequence of the connection process between the virtual switch and the eth interface according to the first embodiment.

When the physical server 20 activates the virtual machine 23, the connection processing unit 132 of the router managing unit 13 specifies the unused eth interface 231 of the activated virtual machine 23 (Step S31). For example, the connection processing unit 132 acquires indices of the eth interfaces 231 for v4 that are stored in the vSW usage management table 11 by using the identification ID of the activated virtual machine 23 as a search key. Specifically, the connection processing unit 132 acquires a set of the eth interfaces 231 that are already used for connection. The connection processing unit 132 checks the index of the eth interface 231 from zero, and specifies an unused index.

The connection processing unit 132 requests the activated virtual machine 23 to generate a new eth interface 231, a new v4v6 translation module 22, and a new virtual switch 21 indicated by the specified index (Step S32).

The virtual machine 23 generates a new eth interface 231 indicated by the specified index based on the request from the connection processing unit 132 (Step S33). The virtual machine 23 generates a new v4v6 translation module 22 based on the request from the connection processing unit 132 (Step S34). The virtual machine 23 generates a new virtual switch 21 based on the request from the connection processing unit 132 (Step S35).

The connection processing unit 132 notifies the service program 232 on the activated virtual machine 23 that the new eth interface 231 is generated (Step S36).

The connection processing unit 132 connects the generated eth interface 231, the generated v4v6 translation module 22, and the generated virtual switch 21 (Step S37). The connection processing unit 132 adds pieces of information on the eth interface 231, the virtual switch 21, and the v4v6 translation module 22 used for the connection to the vSW usage management table 11 in association with the user name corresponding to the router 3 that has issued the connection request (Step S38). The information on the eth interface 231 is the index of the generated eth interface 231. The information on the virtual switch 21 is the identification ID of the generated virtual switch 21. The information on the v4v6 translation module 22 is the identification ID of the generated v4v6 translation module 22.

Sequence of an Address Setting Process

Figure 8:
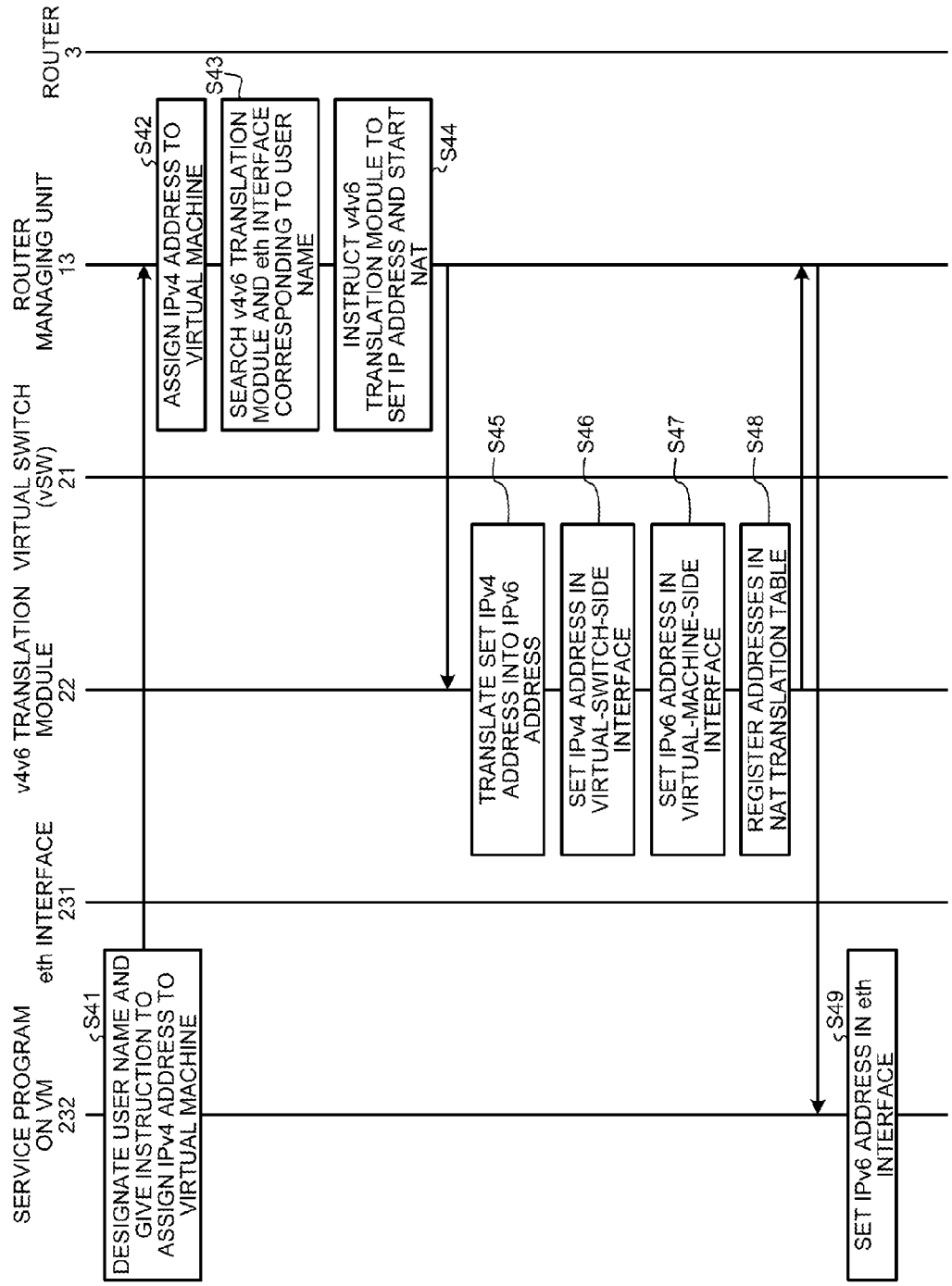
FIG. 8 is a first diagram for explaining the sequence of an address setting process according to the first embodiment.
Figure 9:
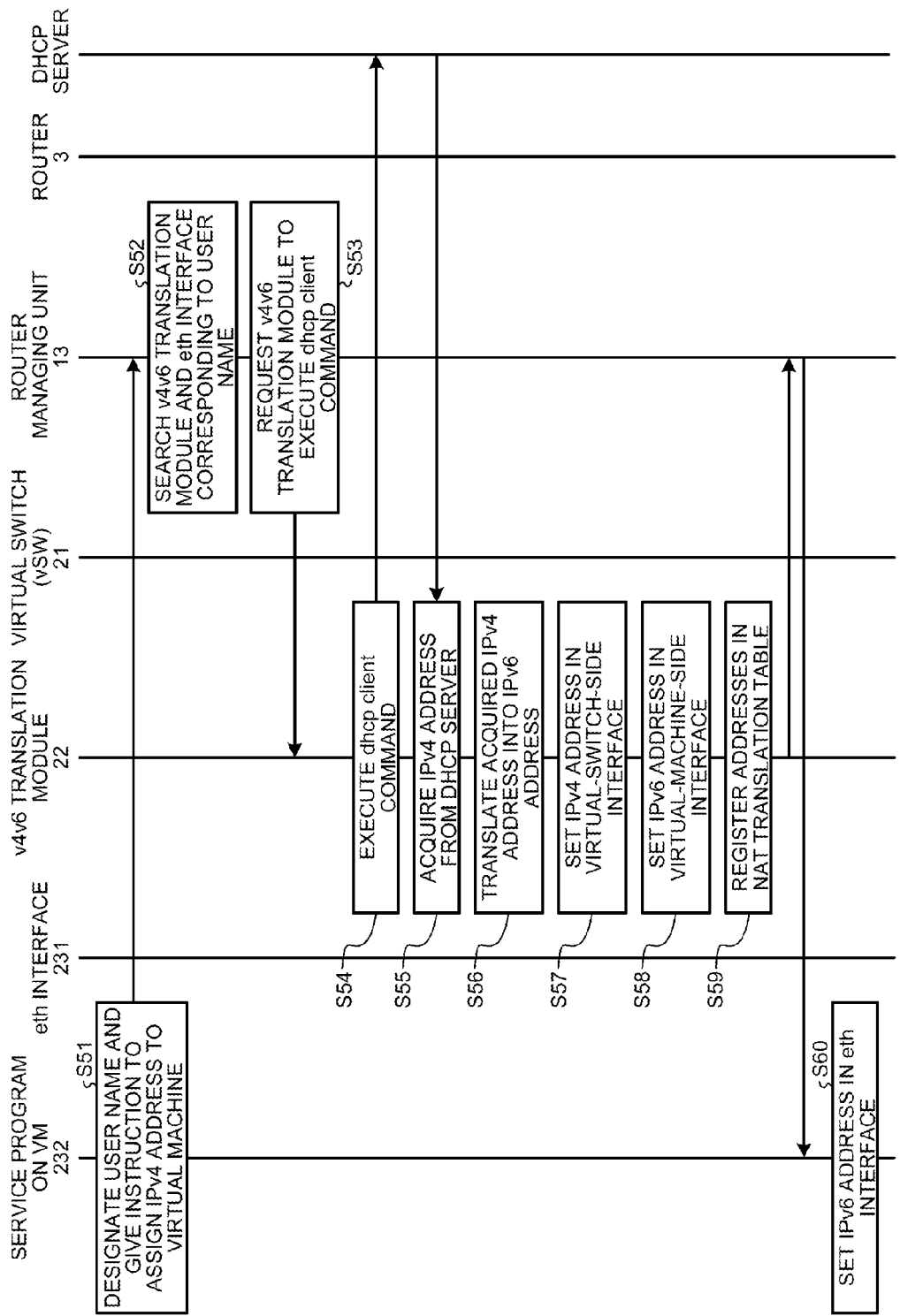
FIG. 9 is a second diagram for explaining the sequence of the address setting process according to the first embodiment.

The process at S24 in FIG. 6 will be explained below with reference to FIG. 8 and FIG. 9. FIG. 8 and FIG. 9 are diagrams for explaining the sequence of an address setting process according to the first embodiment. FIG. 8 illustrates the sequence of the address setting process when the management server 10 assigns the v4 address of the virtual machine 23. FIG. 9 illustrates the sequence of the address setting process when the DHCP server of the customer intranet 4 assigns the v4 address of the virtual machine 23.

As illustrated in FIG. 8, the service program 232 on the virtual machine 23 designates a user name corresponding to the router 3 that has issued the connection request, and gives an instruction to assign a v4 address to the virtual machine 23 (Step S41).

The address setting instructing unit 133 of the router managing unit 13 assigns the v4 address to a designated virtual machine 23 (Step S42). For example, when a packet is transmitted from the user name "A Corporation" to the virtual machine 23, the address setting instructing unit 133 assigns "192.0.0.192/24" as a destination address of the packet. In this example, "192.0.0.192/24" serves as the v4 address of the designated virtual machine 23.

The address setting instructing unit 133 searches the vSW usage management table 11 for pieces of information on the v4v6 translation module 22 and the eth interface 231 corresponding to the designated user name (Step S43). The address setting instructing unit 133 sets the v4 address assigned by the management server 10 in the v4v6 translation module 22 corresponding to the information obtained by the search, and gives an instruction to start NAT on the set IP address (Step S44). The instruction contains the index of the eth interface 231 corresponding to the information obtained by the search. Specifically, the address setting instructing unit 133 gives an instruction to set a v6 address, which is translated from the v4 address assigned by the management server 10, on the eth interface 231 side.

The v4v6 translation module 22 translates the set v4 address into a v6 address serving as a virtual v4 address (Step S45). For example, when the set v4 address is "192.0.0.192", the v4v6 translation module 22 translates "192.0.0.192" into "fe80::<192.0.0.192>". In this example, "fe80::<192.0.0.192>" serves as the virtual v4 address, that is, the v6 address.

The v4v6 translation module 22 sets the v4 address before translation in the interface on the virtual switch 21 side (Step S46). For example, the v4v6 translation module 22 issues a command of "ifconfig 1 192.0.0.192 255.255.255.0". "1" in the command indicates a name of the interface on the virtual switch 21 side, that is, the identification ID of the virtual switch 21.

The v4v6 translation module 22 sets the v6 address after translation in the interface on the virtual machine 23 side (Step S47). For example, the v4v6 translation module 22 issues a command of "ifconfig 1 fe80::<192.0.0.192>". "1" in the command is the name of the interface on the virtual machine 23 side, that is, the index of the eth interface 231.

The v4v6 translation module 22 registers the v4 address before translation and the v6 address after translation in the NAT translation table 221 in an associated manner (Step S48). For example, the v4v6 translation module 22 registers "192.0.0.192" and "fe80::<192.0.0.192>" in an associated manner.

The v4v6 translation module 22 notifies the address setting instructing unit 133 in the router managing unit 13 of completion of the NAT. The router managing unit 13 notifies the service program 232 of completion of assignment of the v4 address to the virtual machine. The service program 232 sets the v6 address after translation in the eth interface 231 (Step S49).

Next, as illustrated in FIG. 9, the service program 232 on the virtual machine 23 designates a user name corresponding to the router 3 that has issued the connection request, and gives an instruction to assign a v4 address to the virtual machine 23 (Step S51).

The address setting instructing unit 133 searches the vSW usage management table 11 for pieces of information on the v4v6 translation module 22 and the eth interface 231 corresponding to the designated user name (Step S52). The address setting instructing unit 133 requests the v4v6 translation module 22 corresponding to the information obtained by the search to execute a "dhcp client" command for the DHCP server of the customer intranet 4 corresponding to the user name (Step S53). The "dhcp client" command is a command to instruct the DHCP server to assign an IP address. The request issued to the v4v6 translation module 22 contains the index of the eth interface 231 corresponding to the information obtained by the search. Specifically, the address setting instructing unit 133 gives an instruction to set a v6 address, which is translated from the v4 address assigned by the DHCP server, on the eth interface 231 side.

The v4v6 translation module 22 executes the requested "dhcp client" command on the DHCP server of the customer intranet 4 corresponding to the user name (Step S54). The v4v6 translation module 22 acquires the v4 address assigned by the DHCP server from the DHCP server (Step S55).

The v4v6 translation module 22 translates the acquired v4 address into a v6 address serving as a virtual v4 address (Step S56).

The v4v6 translation module 22 sets the v4 address before translation in the interface on the virtual switch 21 side (Step S57).

The v4v6 translation module 22 sets the v6 address after translation in the interface on the virtual machine 23 side (Step S58).

The v4v6 translation module 22 registers the v4 address before translation and the v6 address after translation in the NAT translation table 221 in an associated manner (Step S59).

The v4v6 translation module 22 notifies the address setting instructing unit 133 in the router managing unit 13 of completion of the NAT. The router managing unit 13 notifies the service program 232 of completion of assignment of the v4 address to the virtual machine. The service program 232 sets the v6 address after translation in the eth interface 231 (Step S60).

Therefore, the packet transmitted by the customer intranet 4 (the customer PC 5) connected to the router 3 that is enabled to communicate with the virtual machine 23 arrives at the v4v6 translation module 22 via the virtual switch 21. The v4v6 translation module 22 translates the v4 address of the transmission source in the packet into a v6 address serving as a virtual v4 address, and sends the translated IP address to the corresponding eth interface 231. Therefore, even when the IP addresses of the transmission sources (the customer PCs 5) in the packets transmitted by the two customer intranets 4 are the same, the customer PCs 5 can be connected to the eth interfaces 231 that differ for each customer. Therefore, it becomes possible to enable secure communication with the virtual machine 23 serving as a transmission destination.

Advantageous Effect of the First Embodiment

According to the first embodiment as described above, when the management server 10 is compatible with an IPv4-based network, the router managing unit 13 specifies an index of the eth interface 231 that is not stored in the vSW usage management table 11 with respect to the virtual machine 23 that satisfies the connection request. The router managing unit 13 connects the router 3 that has issued the connection request and the virtual machine 23 by using the eth interface 231 indicated by the specified index. Therefore, the router managing unit 13 connects the router 3 and the virtual machine 23 by using the eth interface 231 that differs for each of the routers 3 that have issued the connection requests. Consequently, it becomes possible to enable secure communication between a single virtual machine 23 and a plurality of the routers 3 even when IPv4 is used. Namely, the router managing unit 13 can enable secure communication between a single virtual machine 23 and the customer PCs 5 of intranets corresponding to the respective routers 3 even when IPv4 is used.

Furthermore, according to the first embodiment as described above, when the management server 10 assigns an IPv4 address of a transmission destination of the customer PC 5 in the customer intranet 4, the router managing unit 13 gives instructions as described below. Specifically, the router managing unit 13 searches the vSW usage management table 11 for an index of the eth interface 231 corresponding to a customer of the customer intranet 4 to which the customer PC 5 belongs. The router managing unit 13 instructs the v4v6 translation module 22 to set an IPv6 address, which is translated from an Ipv4 address assigned by the management server 10, on the eth interface 231 side indicated by the index obtained by the search. Therefore, the router managing unit 13 sets an IPv6 address translated from the IPv4 address that differs for each of the customer PCs 5 on the eth interface 231 side even when IPv4 is used. Consequently, it becomes possible to enable secure communication by using the eth interface 231.

Moreover, according to the first embodiment as described above, when the customer intranet 4 side to which the customer PC 5 belongs assigns an IPv4 address of a transmission destination of the customer PC 5, the router managing unit 13 gives instructions as described below. Specifically, the router managing unit 13 searches the vSW usage management table 11 for an index of the eth interface 231 corresponding to a customer of the customer intranet 4 to which the customer PC 5 belongs. The router managing unit 13 instructs the v4v6 translation module 22 to set an IPv6 address, which is translated from the IPv4 address assigned by the customer intranet 4 side, on the eth interface 231 side indicated by the index obtained by the search. Therefore, the router managing unit 13 sets the IPv6 address translated from the IPv4 address that differs for each of the customer PCs 5 on the eth interface 231 side even when IPv4 is used. Consequently, it becomes possible to enable secure communication by using the eth interface 231.

[b] Second Embodiment

In the virtual machine system 9 according to the first embodiment, a case has been explained that the management server 10 is compatible with the IPv4-based network. However, the management server 10 is not limited to the above embodiment, and may be compatible with a dual stack network that is a scheme for enabling coexistence between IPv4 and IPv6. In a second embodiment, a case will be explained that the management server 10 is compatible with the dual stack network.

Configuration of a Virtual Machine System According to the Second Embodiment

Figure 10:
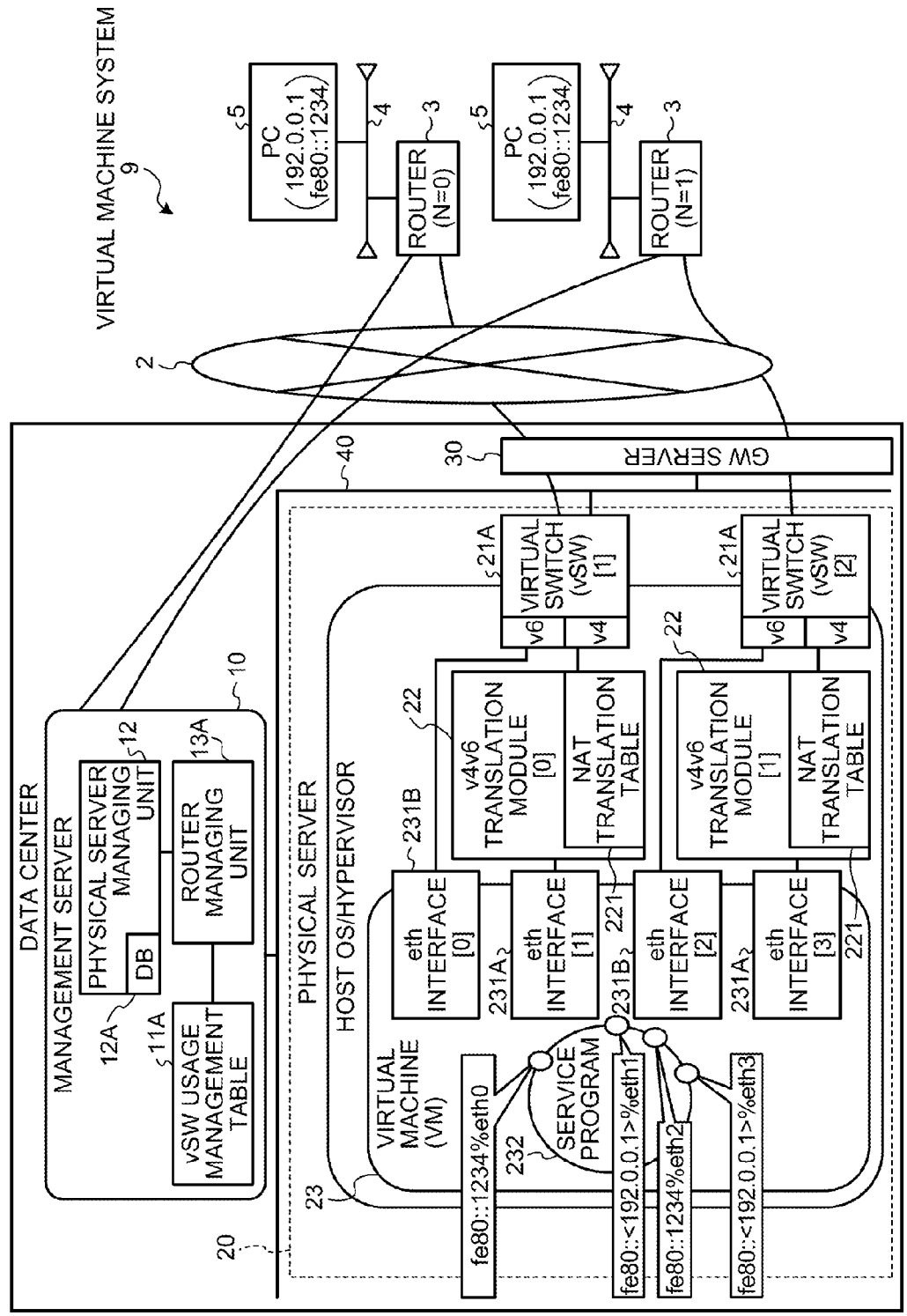
FIG. 10 is a diagram of a configuration of a virtual machine system according to a second embodiment.
Figure 12:
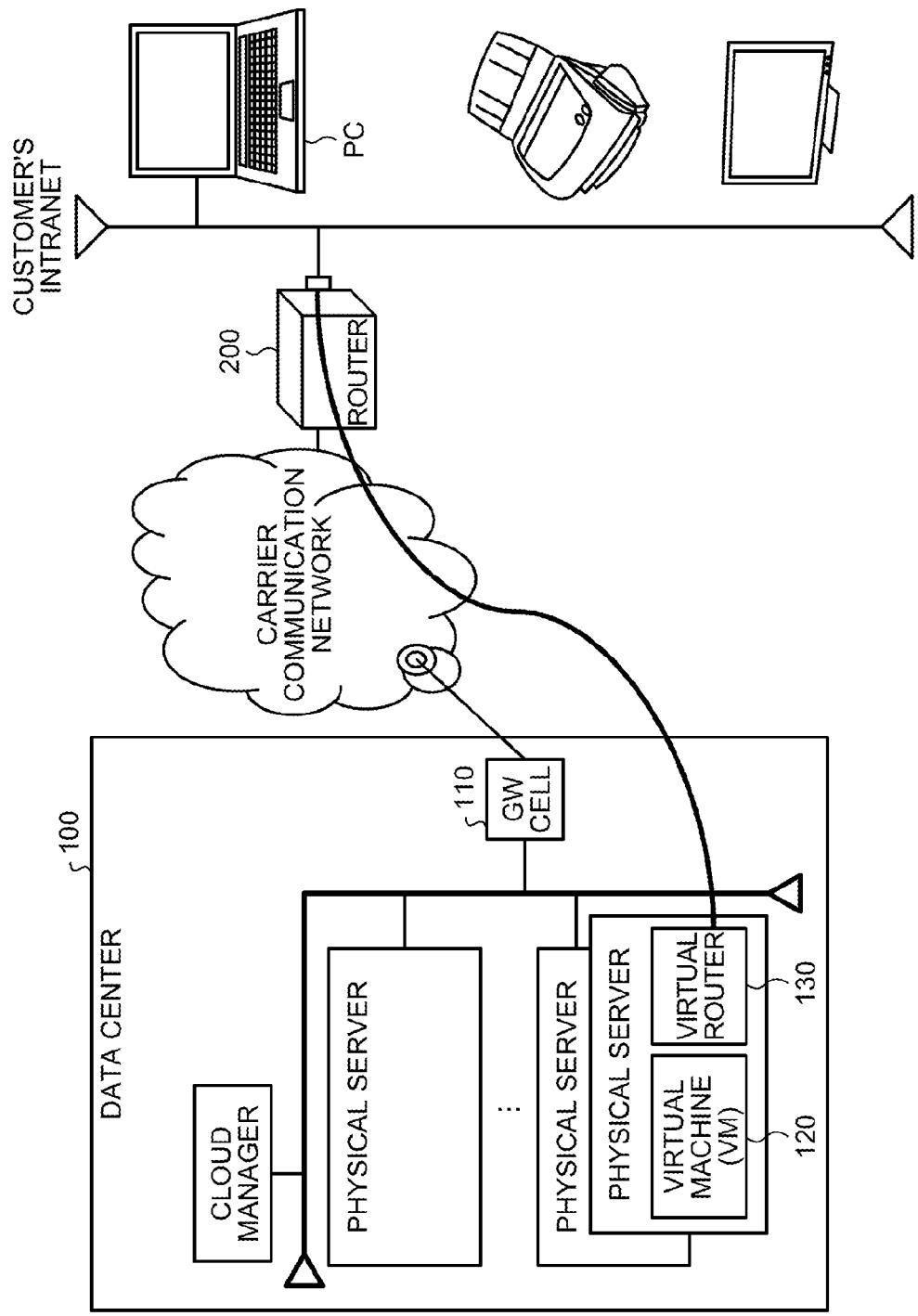
FIG. 12 is a diagram for explaining an example of a conventional technology.
Figure 13:
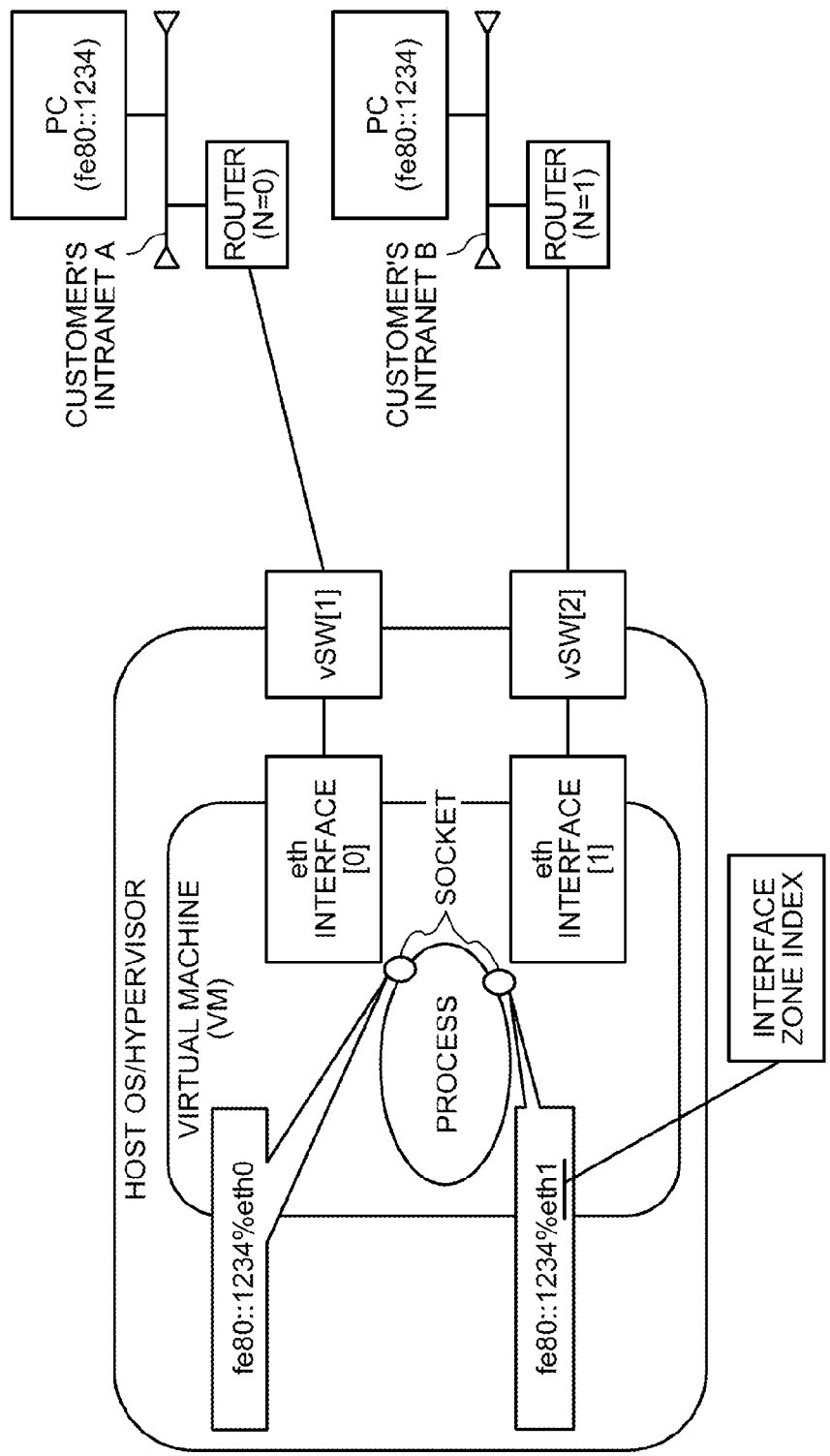
FIG. 13 is a diagram for explaining an IPv6 zone index.

FIG. 10 is a diagram of a configuration of a virtual machine system according to the second embodiment. The same components as those of the virtual machine system 9 illustrated in FIG. 1 are denoted by the same reference numerals and symbols, and explanation of the same configurations and operations will be omitted. The second embodiment differs from the first embodiment in that the virtual switch 21 is changed to a virtual switch 21A to enable coexistence between v6 and v4. The second embodiment also differs from the first embodiment in that the eth interface 231 is divided into an eth interface 231A and an eth interface 231B. The second embodiment also differs from the first embodiment in that the router managing unit 13 of the management server 10 is changed to a router managing unit 13A.

The eth interface 231A and the eth interface 231B are communication interfaces virtually generated on the virtual machine 23. The eth interface 231A is an interface for IPv4. Specifically, the eth interface 231A is an IPv4 channel for the customer intranet 4 that generates a link-local with the virtual machine 23. On the other hand, the eth interface 231B is an interface for IPv6. Specifically, the eth interface 231B is an IPv6 channel for the customer intranet 4 that generates a link-local with the virtual machine 23. Fixed identifiers (indices) are assigned to the eth interface 231A and the eth interface 231B so as not to be redundant.

The IPv4 interface and the IPv6 interface are separated in view of the circumstances in which a v6 address serving as a virtual v4 address translated from the v4 address on the customer side is identical to the v6 address on the customer side. In the example illustrated in FIG. 10, the eth interface 231B with the index of "0" corresponds to a socket to which "fe80::1234% eth0" is assigned in the service program 232. The eth interface 231A with the index of "1" corresponds to a socket to which "fe80::<192.0.0.1>% eth1" is assigned in the service program 232. Even if "fe80::1234" and "fe80::<192.0.0.192>" are the same, v6 and v4 can be distinguished from each other by the indices of the eth interfaces 231A and 231B. The index of the eth interface 231B corresponds to the zone index defined by IPv6; however, the zone index itself may be used.

After establishing communication between the router 3 that has issued the connection request and the GW server 30, the router managing unit 13A performs a connection process between the virtual switch 21A and the eth interfaces 231A and 231B in order to connect the router 3 that has issued the connection request and the virtual machine 23 that satisfies the connection request. The process for establishing communication is the same as the process explained with regard to the communication establishing unit 131 illustrated in FIG. 4, and therefore, the same explanation will not be repeated. The connection process is performed by the connection processing unit 132 illustrated in FIG. 4 as described below.

The connection processing unit 132 connects the virtual switch 21A, the v4v6 translation module 22, and the eth interface 231A for IPv4 for each connection request. The connection processing unit 132 connects the virtual switch 21A and the eth interface 231B for IPv6 for each connection request.

For example, the connection processing unit 132 specifies indices of the eth interfaces 231 for IPv6 and IPv4 of the virtual machine 23 corresponding to the VM device information received as the connection request from the router 3. The indices are specified by using a vSW usage management table 11A. Specifically, the connection processing unit 132 specifies, as an index of the eth interface 231A for IPv4, an unused index that is not stored as information on the v4 interface and information on the v6 interface in the vSW usage management table 11A. The connection processing unit 132 specifies, as an index of the eth interface 231B for IPv6, an index that is not stored as information on the v4 interface and information on the v6 interface in the vSW usage management table 11A.

The connection processing unit 132 requests the service program 232 of the corresponding virtual machine 23 to generate a new eth interface 231A, a new v4v6 translation module 22, and a new virtual switch 21A indicated by the specified index for IPv4. The connection processing unit 132 requests the service program 232 of the corresponding virtual machine 23 to generate a new eth interface 231B and a new virtual switch 21A indicated by the specified index for IPv6.

The connection processing unit 132 connects, for IPv4, the eth interface 231A, the v4v6 translation module 22, and the virtual switch 21A that are generated by the request. The connection processing unit 132 connects, for IPv6, the eth interface 231B and the virtual switch 21A that are generated by the request.

The connection processing unit 132 adds pieces of the information on the eth interfaces 231A and 231B, the virtual switch 21A, and the v4v6 translation module 22 used for the connection to the vSW usage management table 11A in association with the user name of the customer that has issued the connection request. A data structure of the vSW usage management table 11A will be explained below with reference to FIG. 11.

FIG. 11 is a diagram illustrating an example of the data structure of the vSW usage management table according to the second embodiment. The same data items as those of the vSW usage management table 11 illustrated in FIG. 2 are denoted by the same reference numerals and symbols, and the same explanation will not be repeated. The second embodiment differs from the first embodiment in that a v6 eth interface (index) 11g is added to the interface connection status 11d. The v6 eth interface (index) 11g indicates an index of the eth interface 231B used for IPv6. The v4 eth interface (index) 11f indicates an index of the eth interface 231A used for IPv4.

As one example, when the user name 11a is "A Corporation", "0" is stored as the v4 eth interface (index) 11f and "1" is stored as the v6 eth interface (index) 11g. Specifically, the v4 eth interface (index) 11f and the v6 eth interface (index) 11g are values that are not redundant to each other and that are not redundant to the index corresponding to the same virtual machine 11e.

The router managing unit 13A sets the v6 address assigned to the virtual machine 23 on the eth interface 231B. The instruction to set the v4 address is issued in the same manner as performed by the address setting instructing unit 133 illustrated in FIG. 4, and therefore, the same explanation will not be repeated.

The router managing unit 13A notifies the router 3 of the v4 IP address and the v6 IP address assigned to the virtual switch 21A, and notifies the virtual switch 21A of the IP address of the router 3. The router managing unit 13A establishes communication between the router 3 and the virtual switch 21A based on Ethernet over IP. The IP address notification process is performed by the address transmitting unit 134 illustrated in FIG. 4.

As described above, the router managing unit 13A separates the eth interface 231A for IPv4 and the eth interface 231B for IPv6. Therefore, the router managing unit 13A can enable secure communication between a single virtual machine 23 and the router 3 even when IPv4/IPv6 dual stack is used. Furthermore, the router managing unit 13A connects the router 3 and the virtual machine 23 by using the eth interfaces 231A and 231B that differ for each of the routers 3 that have requested the connection requests. Therefore, even when IPv4 is used, it becomes possible to enable secure communication between a single virtual machine 23 and a plurality of the routers 3.

The management server 10 can be realized by mounting the functions of the physical server managing unit 12 and the router managing unit 13 as described above onto a known information processing apparatus, such as a personal computer or a workstation. Furthermore, the physical server 20 can be realized by mounting the functions of the virtual machine 23, the eth interface 231, and the v4v6 translation module 22 as described above onto an above-described Host OS/Hypervisor of a known information processing apparatus, such as a personal computer or a workstation.

In the above embodiments, the physical server managing unit 12 and the router managing unit 13 are included in the management server 10. However, the present invention is not limited to this configuration. The physical server managing unit 12 and the router managing unit 13 may be provided separately in independent servers.

Furthermore, the components of the apparatuses illustrated in the drawings do not necessarily have to be physically configured in the manner illustrated in the drawings. In other words, specific forms of disintegration and integration of the apparatuses are not limited to those illustrated in the drawings, and all or part of the apparatuses can be functionally or physically disintegrated or integrated in arbitrary units according to various loads and the state. For example, the physical server managing unit 12 and the router managing unit 13 may be integrated into one unit. On the other hand, the router managing unit 13 may be disintegrated into the communication establishing unit 131, the connection processing unit 132, the address setting instructing unit 133, and the address transmitting unit 134. Furthermore, the vSW usage management table 11 may be stored in an external apparatus of the management server 10, and the external apparatus storing the vSW usage management table 11 may be connected to the management server 10 via a network.

According to one embodiment of the present invention, it becomes possible to enable secure communication between a single virtual machine and a plurality of customer networks even when IPv4 is used.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A management server comprising a memory and a processor connected to the memory, the processor being configured to execute a process including managing a physical server that operates a virtual machine, the process further comprising:

specifying, when the management server is compatible with an IPv4 network and when receiving a connection request to establish a connection to the physical server from a relay device via a virtual private network, the relay device being connected to a client network to which an information processing apparatus belongs, an identifier, an interface identified thereby being not used for a virtual machine meeting the connection request, wherein the interface is used for connecting the information processing apparatus to the virtual machine and the identifier corresponds to a zone index of an IPv6 address for distinguishing the client network from another client network, an identifier that is stored in association with a virtual machine in a storage unit indicating that an interface identified thereby is currently used;

instructing the virtual machine to virtually generate an address translating unit, the generated address translating unit translating an IPv4 address of a transmission destination of the information processing apparatus belonging to the client network to an IPv6 address and setting the translated IPv6 address on an interface side of the generated address translating unit, the interface side corresponding to the interface identified by the specified identifier;

connecting the relay device and the virtual machine based on an address of a virtual switch corresponding to the interface identified by the specified identifier and an address of the relay device, the virtual machine distinguishing the client network to which the information processing apparatus belongs from another client network by the translated IPv6 address and the specified identifier; and storing the specified identifier in the storage unit in association with the virtual machine and the client network connected to the relay device that is connected to the virtual machine at the connecting.

2. The management server according to claim 1, the process further comprising, when the process includes assigning an IPv4 address of a transmission destination of the information processing apparatus belonging to the client network, searching for the stored identifier of the interface corresponding to the client network of the information processing apparatus in the storage unit, wherein the instructing includes instructing the virtual machine to virtually generate an address translating unit, the generated address translating unit translating the assigned IPv4 address to an IPv6 address and setting the translated IPv6 address on an interface side of the generated address translating unit, the interface side corresponding to the interface indicated by the searched identifier.

3. The management server according to claim 1, the process further comprising, when a client network side to which the information processing apparatus belongs assigns an IPv4 address of a transmission destination of the information processing apparatus, searching for the stored identifier of the interface corresponding to the client network of the information processing apparatus in the storage unit, wherein the instructing includes instructing the virtual machine to virtually generate an address translating unit, the generated address translating unit translating the assigned IPv4 address to an IPv6 address and setting the translated IPv6 address on an interface side of the generated address translating unit, the interface side corresponding to the interface indicated by the searched identifier.

4. A virtual machine system in which a physical server that operates a virtual machine and a management server are connected to each other, and the management server comprises a memory and a processor connected to the memory, the processor being configured to execute a process including managing the physical server, wherein the process further includes specifying, when the management server is compatible with an IPv4 network and when receiving a connection request to establish a connection to the physical server from a relay device via a virtual private network, the relay device being connected to a client network to which an information processing apparatus belongs, an identifier, an interface identified thereby being not used for a virtual machine meeting the connection request, wherein the interface is used for connecting the information processing apparatus to the virtual machine and the identifier corresponds to a zone index of an IPv6 address for distinguishing the client network from another client network, an identifier that is stored in association with a virtual machine in a storage unit indicating that an interface identified thereby is currently used;

instructing the virtual machine to virtually generate an address translating unit, the generated address translating unit translating an IPv4 address of a transmission destination of the information processing apparatus belonging to the client network to an IPv6 address and setting the translated IPv6 address on an interface side of the generated address translating unit, the interface side corresponding to the interface identified by the specified identifier;

connecting the relay device and the virtual machine based on an address of a virtual switch corresponding to the interface identified by the specified identifier and an address of the relay device, the virtual machine distinguishing the client network to which the information processing apparatus belongs from another client network by the translated IPv6 address and the specified identifier; and storing the specified identifier for identifying the interface used for the connection in the storage unit in association with the client network connected to the relay device that is connected to the virtual machine at the connecting and the virtual machine.

5. The virtual machine system according to claim 4, wherein the process further includes, when the process includes assigning an IPv4 address of a transmission destination of the information processing apparatus belonging to the client network, searching for the stored identifier of the interface corresponding to the client network of the information processing apparatus in the storage unit, wherein the instructing includes instructing the virtual machine to virtually generate an address translating unit, the generated address translating unit translating the assigned IPv4 address into an IPv6 address that is a virtual IPv4 address, setting the translated IPv6 address on an interface side of the generated address translating unit, the interface side corresponding to the interface indicated by the searched identifier, and setting the assigned IPv4 address on an output side of the generated address translating unit for output to the client network of the information processing apparatus.

6. The virtual machine system according to claim 4, wherein the process further includes, when a client network side to which the information processing apparatus belongs assigns an IPv4 address of a transmission destination of the information processing apparatus, searching for the stored identifier of the interface corresponding to the client network of the information processing apparatus in the storage unit, wherein the instructing includes instructing the virtual machine to virtually generate an address translating unit, the generated address translating unit requesting the client network side of the information processing apparatus to send an IPv4 address of a destination, receiving the IPv4 address from the client network side, translating the received IPv4 address into an IPv6 address that is a virtual IPv4 address, setting the translated IPv6 address on an interface side of the generated address translating unit, the interface side corresponding to the interface indicated by the searched identifier, and setting the IPv4 address received from the client network side on an output side of the generated address translating unit for output to the client network of the information processing apparatus.

7. The virtual machine system according to claim 5, wherein the generated address translating unit translates an IPv4 address indicating a transmission source in a packet transmitted by the information processing apparatus into an IPv6 address, and sends the translated IPv6 address to the interface corresponding to the generated address translating unit.

8. The virtual machine system according to claim 6, wherein the generated address translating unit translates an IPv4 address indicating a transmission source in a packet transmitted by the information processing apparatus into an IPv6 address, and sends the translated IPv6 address to the interface corresponding to the generated address translating unit.

9. A non-transitory computer-readable recording medium having stored therein a program causing a management server for managing a physical server that operates a virtual machine to execute a process, the process comprising:
   receiving, when the management server is compatible with an IPv4 network, a connection request to establish a connection to the physical server from a relay device connected to the management server via a virtual private network;
   specifying an identifier, an interface identified thereby being not used for a virtual machine meeting the connection request, wherein the interface is used for connecting the virtual machine and an information processing apparatus that belongs to a client network to which the relay device connects and the identifier corresponds to a zone index of an IPv6 address for distinguishing the client network from another client network, an identifier that is stored in association with a virtual machine in a storage unit indicating that an interface identified thereby is currently used;
   instructing the virtual machine to virtually generate an address translating unit, the generated address translating unit translating an IPv4 address of a transmission destination of the information processing apparatus belonging to the client network to an IPv6 address and setting the translated IPv6 address on an interface side of the generated address translating unit, the interface side corresponding to the interface identified by the specified identifier;
   connecting the relay device and the virtual machine based on an address of a virtual switch corresponding to the interface identified by the specified identifier and an address of the relay device, the virtual machine distinguishing the client network to which the information processing apparatus belongs from another client network by the translated IPv6 address and the specified identifier; and
   storing the specified identifier for identifying the interface used for the connection in association with the client network connected to the relay device and the virtual machine.

10. A connection method implemented by a management server for managing a physical server that operates a virtual machine, the connection method comprising:
   receiving, when the management server is compatible with an IPv4 network, a connection request to establish a connection to the physical server from a relay device connected to the management server via a virtual private network;
   specifying an identifier, an interface identified thereby being not used for a virtual machine meeting the connection request, wherein the interface is used for connecting the virtual machine and an information processing apparatus that belongs to a client network to which the relay device connects and the identifier corresponds to a zone index of an IPv6 address for distinguishing the client network from another client network, an identifier that is stored in association with a virtual machine in a storage unit indicating that an interface identified thereby is currently used;
   instructing the virtual machine to virtually generate an address translating unit, the generated address translating unit translating an IPv4 address of a transmission destination of the information processing apparatus belonging to the client network to an IPv6 address and setting the translated IPv6 address on an interface side of the generated address translating unit, the interface side corresponding to the interface identified by the specified identifier;
   connecting the relay device and the virtual machine based on an address of a virtual switch corresponding to the interface identified by the specified identifier and an address of the relay device, the virtual machine distinguishing the client network to which the information processing apparatus belongs from another client network by the translated IPv6 address and the specified identifier; and
   storing the specified identifier for identifying the interface used for the connection in association with the client network connected to the relay device and the virtual machine.

* * * * *